UNITED STATES PATENT OFFICE.

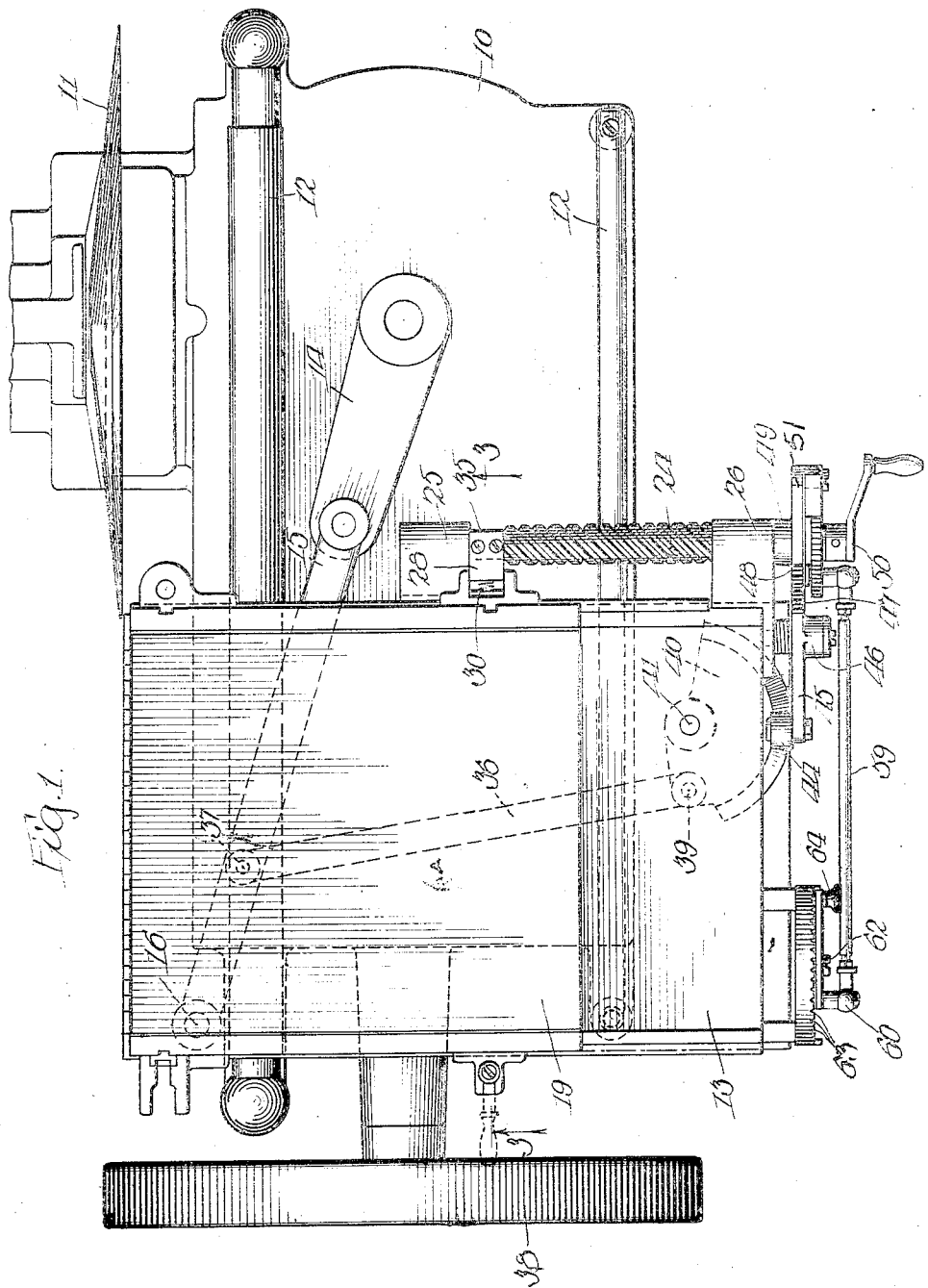

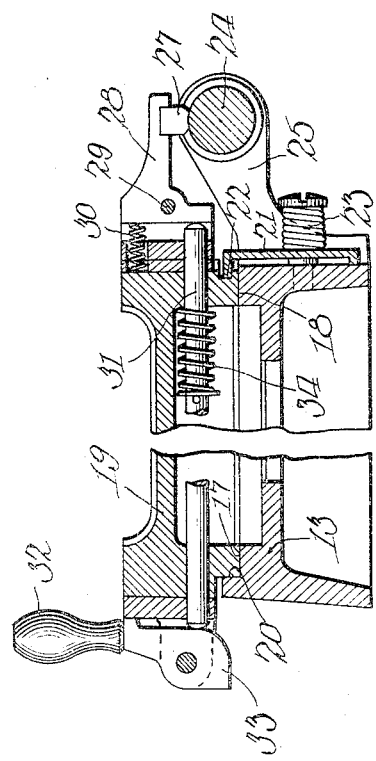
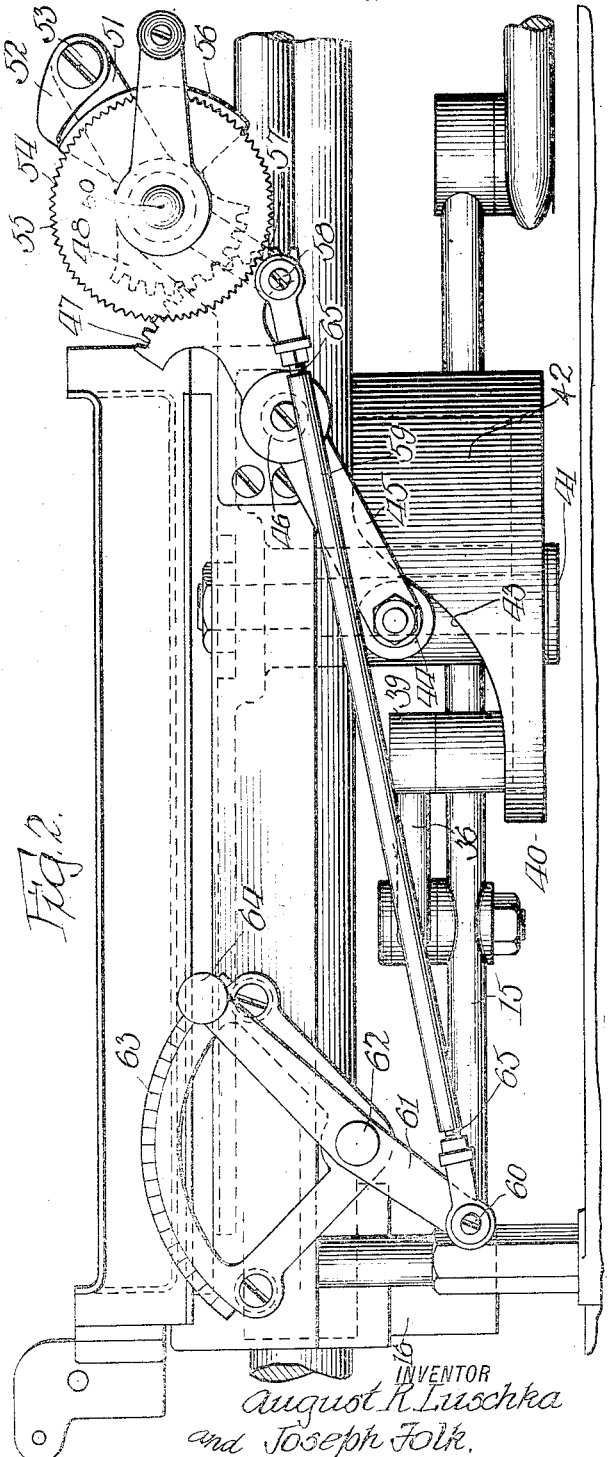

AUGUST R. LUSCHKA AND JOSEPH FOLK, OF LAPORTE, INDIANA, ASSIGNORS TO U. S. SLICING MACHINE COMPANY, OF LAPORTE, INDIANA, A CORPORATION OF INDIANA.

SLICING-MACHINE.

1,314,598.   Specification of Letters Patent.   Patented Sept. 2, 1919.

Application filed March 16, 1918. Serial No. 222,802.

*To all whom it may concern:*

Be it known that we, AUGUST R. LUSCHKA and JOSEPH FOLK, citizens of the United States, residing at Laporte, in the county of Laporte and State of Indiana, have invented certain new and useful Improvements in Slicing-Machines, of which the following is a specification.

This invention relates to machines for slicing meat and other material, and has for its object the provision of a machine of the class named which shall be of improved construction and operation.

The invention is exemplified in the combination and arrangement of parts shown in the accompanying drawings and described in the following specification, and it is more particularly pointed out in the appended claims.

In the drawings—

Figure 1 is a top plan view of a slicing machine to which the present invention is applied.

Fig. 2 is a fragmentary elevational view of the machine shown in Fig. 1; and

Fig. 3 is a section taken on line 3—3 of Fig. 1.

The present invention may be applied to slicing machines of well-known construction in which a reciprocating table is used to move the material to be sliced past a rotary slicing knife, the material being fed forwardly on the table by means of a slicing plate after each slicing operation. In the drawings, the numeral 10 designates the base of a slicing machine provided with a rotary slicing knife 11 and ways 12 on which a table 13 is mounted to reciprocate. The table 13 is provided with suitable bearings for receiving the guideways 12 upon which it is supported and along which it is reciprocated by means of a crank 14 and a pitman rod 15 pivoted to a lug 16 projecting downwardly from the underside of the table. As shown more clearly in Fig. 3, the table 13 is provided on its upper surface with guideways 17 and 18 upon which the meat plate or support 19 is mounted to slide. The guideway 17 is provided with a shoulder 20 which holds the plate 19 from lateral movement in one direction, and a plate 21 is arranged to bear against the opposite side of the meat plate 19 in a notch 22 provided for that purpose, the plate 21 being pressed against the meat support by coil springs 23 which hold the support in place and take up wear.

The meat plate 19 is fed toward the slicing knife 11 once for each reciprocation of the table 13 by a feed screw 24 journaled in brackets 25 and 26 which are supported upon the reciprocating table 13 and project laterally from one side thereof. A half nut 27 is carried on a bracket 28 pivoted to the meat support 19 by a pin 29, the half nut being pressed into engagement with the feed screw 24 by a spring 30 which bears against the bracket 28. The bracket 28 may be swung upon its pivot 29 by a plunger 31 which is operated by a handle 32 and cam 33 located on the side of the meat plate 19 opposite the half nut so as to be convenient to the operator. The plunger 31 is normally held in a retracted position by a spring 34 against the tension of which the cam 33 operates when the half nut 27 is raised out of engagement with the screw 24. A portion of the screw 24 at one end is left free from threads to provide a blank space, as shown at 35, so that the feeding operation of the screw will be automatically discontinued when the meat plate 19 has reached its extreme forward position, as shown in Fig. 1 of the drawings.

The mechanism for imparting rotation to the screw 24 is shown in Figs. 1 and 2 of the drawings, and is operated by a link 36 pivotally connected at 37 to the pitman 15 which reciprocates the carriage 13. It is understood, of course, that the crank 14 which drives the pitman 15 is rotated in the usual manner by a hand wheel 38, or any other suitable driving mechanism. The crank 14 rotates in a clockwise direction, as viewed in Fig. 1, and it will be apparent that the pitman 15 is connected to the table 13 at one side of the center line of the table so that a comparatively uniform forward movement is imparted to the table while a rapid return is secured.

The end of the link 36 opposite its connection with the pitman 15 is pivoted at 39 to a cam segment 40 journaled on a pin 41 extending downwardly from the lower side of the table 13. The cam segment 40 is provided around its periphery with an upstanding wall 42 which has its upper edge curved to form a cam surface 43, on which a roller 44 travels as the cam 40 is oscillated about its pivot 41. The roller 44 is journaled at the end of an arm 45 pivotally supported on a pin 46 which projects outwardly from the table 13. The end of the arm 45 opposite the roller 44 is provided with a segmental rack 47, the teeth of which mesh with a similar rack 48 having its hub 49 mounted to oscillate on the projecting end 50 of the screw 24. Extending from the hub 49 of the gear segment 48 is an arm 51, which carries a pawl 52, pivoted at 53 thereon and arranged to engage the teeth 54 of a ratchet wheel 55, which is rigidly secured to the end 50 of the screw 24.

The parts thus far described are so related that the roller 44 will begin to engage the lower end of the inclined portion of the cam 43 a short time before the crank arm 14 reaches the dead center position shown in Fig. 1. In the position shown in Fig. 1, the table 13 is at the extreme end of its travel away from the slicing knife 11. Before the crank 14 reaches the position shown in that figure, and also after the arm passes that position, the pitman 15 swings about its pivotal connection 16 with the table 13 in a direction away from the pivot 41 of the cam member 40, so that the cam member 40 rotates in a clockwise direction, as viewed in Fig. 1, before, during and after the time that the table 13 changes its direction of travel at the extreme end of its course. The inclined surface 43 is so related to the other parts that the roller 44 moves upwardly over the inclined surface about half of the length of the incline prior to the time that the table 13 reverses its direction of movement and passes over the remaining portion of the inclined cam surface after the table has started upon its return travel. Since this movement of the roller 44 imparts rotation to the screw 24 through the ratchet mechanism described and thus feeds the plate 19 along the guideways on the table 13, it is apparent that this feeding operation of the table will take place during the time just before the table reaches its extreme position and while the table is just starting on its return stroke. It is desirable, of course, to feed the meat forwardly while the plate 19 is clear of the knife 11 so that the meat will not be fed into engagement with the knife, but will be fed past the edge of the knife into position to be cut as the table is brought back on its return stroke. It is desirable also to accomplish this feeding movement by as short a travel of the table beyond the actual cutting position as possible, and for this reason the parts are arranged to utilize both the to and fro movement of the table for feeding the meat plate during the time that the table is traveling beyond the edge of the knife. The plate commences to feed forwardly at the time that the edge of the plate passes the edge of the knife on the backward stroke and continues to feed until the edge of the plate again reaches a position in alinement with the edge of the knife on the forward or cutting stroke. In this way the entire movement of the table beyond the edge of the knife is utilized for feeding the meat plate, and the entire feeding operation takes place while the material upon the plate is clear of the knife. During the time that the meat plate is opposite the knife 11, the roller 44 travels along the straight portions of the cam surface 43 and moves backwardly down the inclined portion of the cam to return the pawl 52 into position for a new rotation of the feed screw 24.

In order to provide for different thicknesses of slices, it is desirable to vary the amount of rotation of the screw 24, and consequently the amount the meat plate 19 is fed forwardly. This is accomplished by means of a cam or shroud 56 which is in the shape of a segmental disk, as shown in Fig. 2 of the drawings, and which is pivotally supported upon the projecting end 50 of the screw 24. A downwardly extending arm 57 is rigidly connected with the shroud 56 and is pivoted at 58 to the end of a link 59, the other end of which is pivoted at 60 to a lever 61 having its fulcrum 62 on the side of the reciprocating table 13. The lever 61 extends upwardly beyond its fulcrum 62 and has resilient contact with a series of notches 63 for holding the lever in various adjusted positions. A finger piece 64 is carried by the upper end of the lever, by means of which it may be moved along the graduated notches 63. By shifting the lever 61 the shroud 56 may be moved to cover varying proportions around the periphery of the ratchet wheel 55, so that the pawl 52 will be held out of engagement with the teeth of the ratchet wheel for various portions of its movement, and in this way the amount of rotation of the ratchet wheel, and consequently of the feed screw 24 may be regulated to produce different thicknesses of slices. The rod 59 is constructed to form in effect a turn-buckle engaging the screws 65, so that the length of the rod may be adjusted to take up wear in the ratchet mechanism. The shroud 56 may also be set to hold the pawl entirely out of engagement with the ratchet to permit rotation of the screw by hand.

It will be seen that the construction described provides feeding mechanism for the meat table which operates at a time when the material upon the table is free from engagement with the slicing knife and which is driven directly by the operating mechanism for the other portions of the machine. The mechanism avails itself of the entire movement of the reciprocating table during the time that the material being sliced is out of engagement with the knife, and the motion derived from the mechanism for reciprocating the table is multiplied by the gear segments 47 and 48 in conjunction with their associated parts so that a maximum rotation of screw 24 may be secured for a minimum movement of the table beyond the knife. The amount of rotation of the screw is also easily adjustable for regulating the thicknesses of the slices. In view of the fact that the operation of the various parts has been described in connection with the description of the construction of the parts it is believed that further details of the operation will be unnecessary.

We claim:—

1. In a slicing machine, a reciprocating table, a meat support movably mounted upon said table, a feed screw for said support, operating mechanism for said slicing machine, and means mounted on said table and connected with said operating mechanism for driving said feed screw, said driving means including movement-increasing mechanism comprising a pair of pivoted levers having intermeshing spur gear segments thereon of different radii.

2. In a slicing machine, a reciprocating table, a meat holder carried by said table, a screw for advancing said meat holder upon said table, operating mechanism for said slicing machine, a cam disk carried by said table, means for oscillating said disk from said operating mechanism, a lever mounted on said table and arranged to be operated by said cam disk, pawl and ratchet mechanism for rotating said screw, and intermeshing spur gear segments for operating said pawl and ratchet mechanism from said lever.

3. A slicing machine comprising a reciprocating table, a meat support movably mounted upon said table, a feed screw for advancing said support upon said table, a pawl and ratchet for rotating said screw, a lever pivotally mounted on said table, a lever for operating said pawl to rotate said ratchet, intermeshing gear teeth upon said lever, a cam mounted on said table for oscillating said first-mentioned lever, means for operating said cam at a predetermined period in the movement of said table, and means for regulating the amount of rotation of said screw by said ratchet mechanism for each operation of said cam.

4. In a slicing machine, a reciprocating table, a meat support movably carried by said table, a feed screw for advancing said support upon said table, pawl and ratchet mechanism for operating said screw, a movable member for controlling the amount of rotation of said screw at each operation of said pawl and ratchet mechanism, an indicator for adjusting said pawl and ratchet controlling member, and means for connecting said indicator with said controlling member, said connecting means being adjustable to compensate for wear to maintain an accurate relation between said indicator and said controlling member.

In testimony whereof we have signed our names to this specification on this 11th day of March, A. D. 1918.

AUGUST R. LUSCHKA.
JOSEPH FOLK.